United States Patent [19]
Chiu

[11] Patent Number: 6,161,025
[45] Date of Patent: Dec. 12, 2000

[54] EXTERNAL COMPILING DEVICE OF A DIRECTORY AND A SCHEDULE CALENDAR OF A MOBILE PHONE

[76] Inventor: Hung-Che Chiu, No. 3, 4th Fl.-2, Lane 28, Sec. 2, Hsin Sheng North Road, Taipei, Taiwan

[21] Appl. No.: 09/052,956

[22] Filed: Apr. 1, 1998

[51] Int. Cl.[7] .................................................. H04M 3/42
[52] U.S. Cl. ........................................ 455/565; 455/567
[58] Field of Search .............................. 395/800; 379/98; 455/557, 564, 566, 460

[56] References Cited

U.S. PATENT DOCUMENTS

| | | | |
|---|---|---|---|
| 5,367,563 | 11/1994 | Sainton | 379/98 |
| 5,659,890 | 8/1997 | Hidaka | 455/575 |
| 5,708,840 | 1/1998 | Kikinis et al. | 395/800 |
| 5,907,815 | 5/1999 | Grimm et al. | 455/557 |

*Primary Examiner*—Thanh Cong Le
*Attorney, Agent, or Firm*—Rosenberg, Klein & Lee

[57] ABSTRACT

The present invention relates to an external compiling device of a directory and a schedule calendar of a mobile phone, in which the original communication port of the mobile phone, or an additional communication port is connected with an external data conversion and detection circuit so that it may be used to connect with the communication port of a general used computer, thus the individual data about the schedule calendar, directory, etc. may be received directly, thus the user may search these messages as required. The conventional inconvenience of disconnection between the mobile phone and computer is improved. Thus the disadvantage that the mobile phone can not employed to edit pictograph characters are improved, therefore, the both databases of the computer and mobile phone have the same editing data.

3 Claims, 6 Drawing Sheets

| No. | classification |
|---|---|
| 001 – 050 | relations |
| 051 – 100 | classmate |
| 101 – 150 | friend |
| 151 – 200 | company |
| 201 – 250 | colleague |
| 251 – 300 | customer |
| 301 – 350 | others |

FIG. 5A

| | | | transmission | non-transmission | |
|---|---|---|---|---|---|
| cl. | No. | name | FAX: | Tel: | address |
| relations | 001 | | | | |
| classmate | 051 | | | | |
| friend | 101 | | | | |

FIG. 5B

EXTERNAL COMPILING DEVICE OF A DIRECTORY AND A SCHEDULE CALENDAR OF A MOBILE PHONE

BACKGROUND OF THE INVENTION

The present invention relates to an external compiling device of a directory and a schedule calendar of a mobile phone, especially to a mobile phone could be employed to input pictograph characters from a computer or PDA to the external compiling device thereof for storing and displaying.

In general, the database for directory number is installed within a mobile phone for storing the generalized used directory number, date and time. However, since the key of the mobile phone is limited, thus only some representing data may be inputted, the complex characters may not be inputted directly, thus the using efficiency of a mobile phone is reduced.

Accordingly, the primary object of present invention is to provide an external compiling device of a directory and a schedule calendar of a mobile phone, in which the original communication port of the mobile phone, or an additional communication port is connected with an external data conversion and detection circuit so that it may be used to connect with the communication port of a general used computer, thus the individual data about the schedule calendar, directory, etc. may be received directly, thus the user may search these messages as required Another object of the present invention is to provide an external compiling device of a mobile phone, after the data has been complied and stored, if the mobile phone has received a message, this message may be compared with the storage data of the directory number within the mobile phone, if yes, the name with the same directory number is displayed on the display screen, thus the owner of the mobile phone may know the caller.

Another object of the pet invention is to provide an external compiling device of a mobile phone by which the schedule calendar within the computer may directly be transferred into the mobile phone so that the mobile phone may inform the schedule to the user according the counter (day, hour, and minute) within mobile phone and the content of the schedule is also displayed on the screen.

BRIEF DESCRIPTION OF THE DRAWINGS

The present invention will be better understood and its numerous objects and advantages will become apparent to those skilled in the art by referencing to the following drawings in which:

FIGS. 5A and 5B are the schematic representation of the data compiling arrangement in the present invention.

DESCRIPTION OF THE PREFERRED EMBODIMENT

Figure 1:
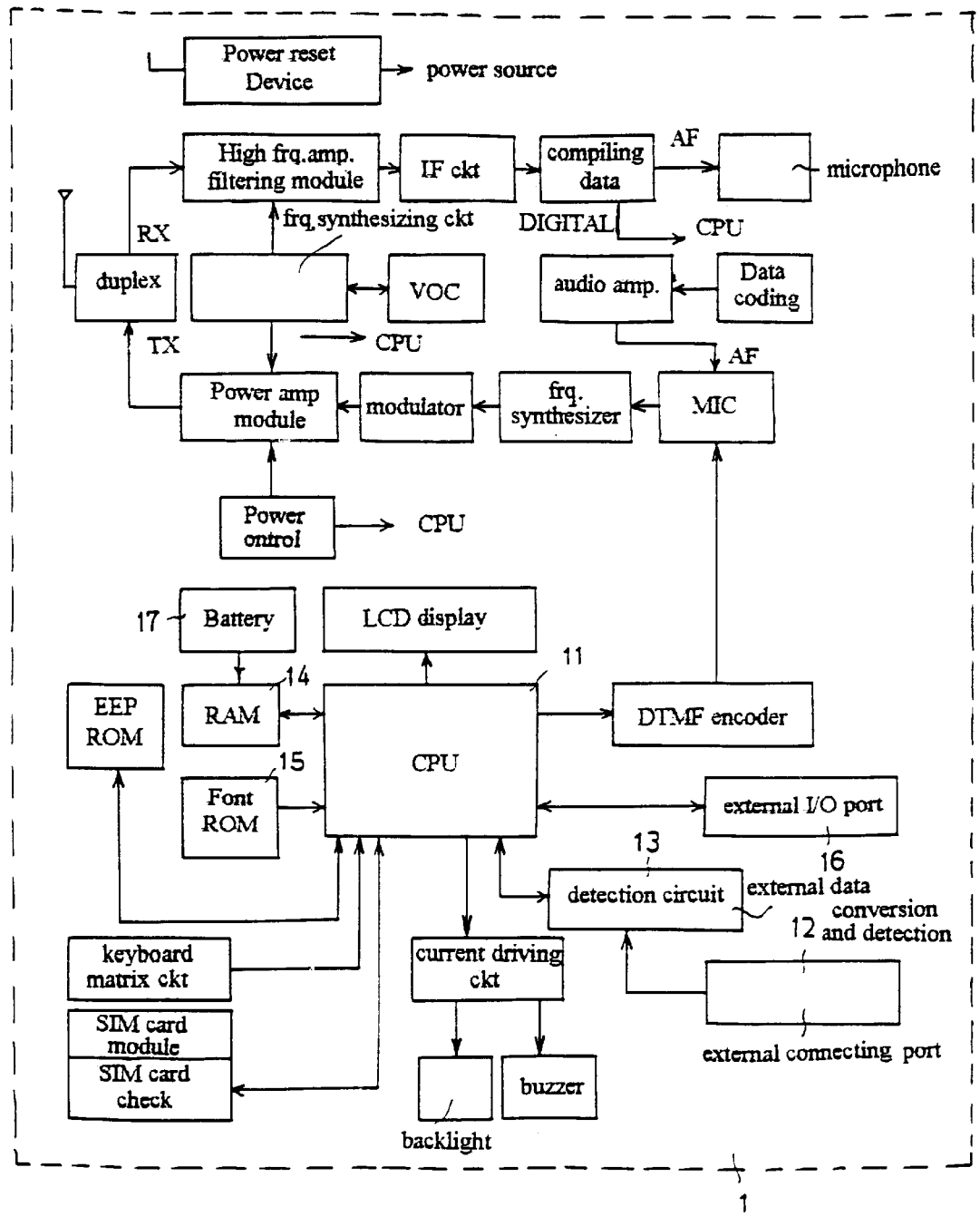
FIG. 1 is a block diagram of circuit in the present invention.

Referring now to FIG. 1, in the present invention, other than the general functions of a mobile phone are retained on the original central processing unit (CPU) (11) within a mobile phone (1), further related mobile phone functions are added therein, for example:

1. Flow control—for controlling the operation flow.
2. Inner data accessing—for accessing the input data in the individual database.
3. Data display—for displaying individual data on a display screen.
4. Data contrast—for contrasting the receiving data with the data stored in a memory.

while said central processing unit is connected with an external connecting ports (12) and an external data conversion and detection circuit (13) for connecting with an external compiler to form a linkage of the input and output of individual data. Wherein the connecting manner includes:

Serial port: for example, RS-232, RS-429, RS-422, RS-423.

Parallel port: for example, pin port.

Infrared port while the external data conversion and detection circuit is used to detect the external signal receiving by the connecting port (12), and transform the level thereof, and protect the circuit for preventing the external abnormal voltage to destroy the inner circuit.

The central processing unit is also connected with a random memory (14) and a word database memory (15), wherein the random memory (14) is a random memory for storing general data and individual data, while said word database memory (15) may be installed with different written language according to different nations such as Chinese, Japanese, Korean, etc.)

Furthermore, the central processing unit (11) is also connected with an external I/O port (16) so that the individual data may be connected with the external data conversion and detection circuit (13) through the extending pin of the external port (16) for accessing data. Thus when the external connecting port (12) has not been further installed, the output and input ports (16) also may be extended as the input port for individual data compiling, and a battery device (17) is used to sustain the data on the random memory as the battery device is updated.

Figure 2:
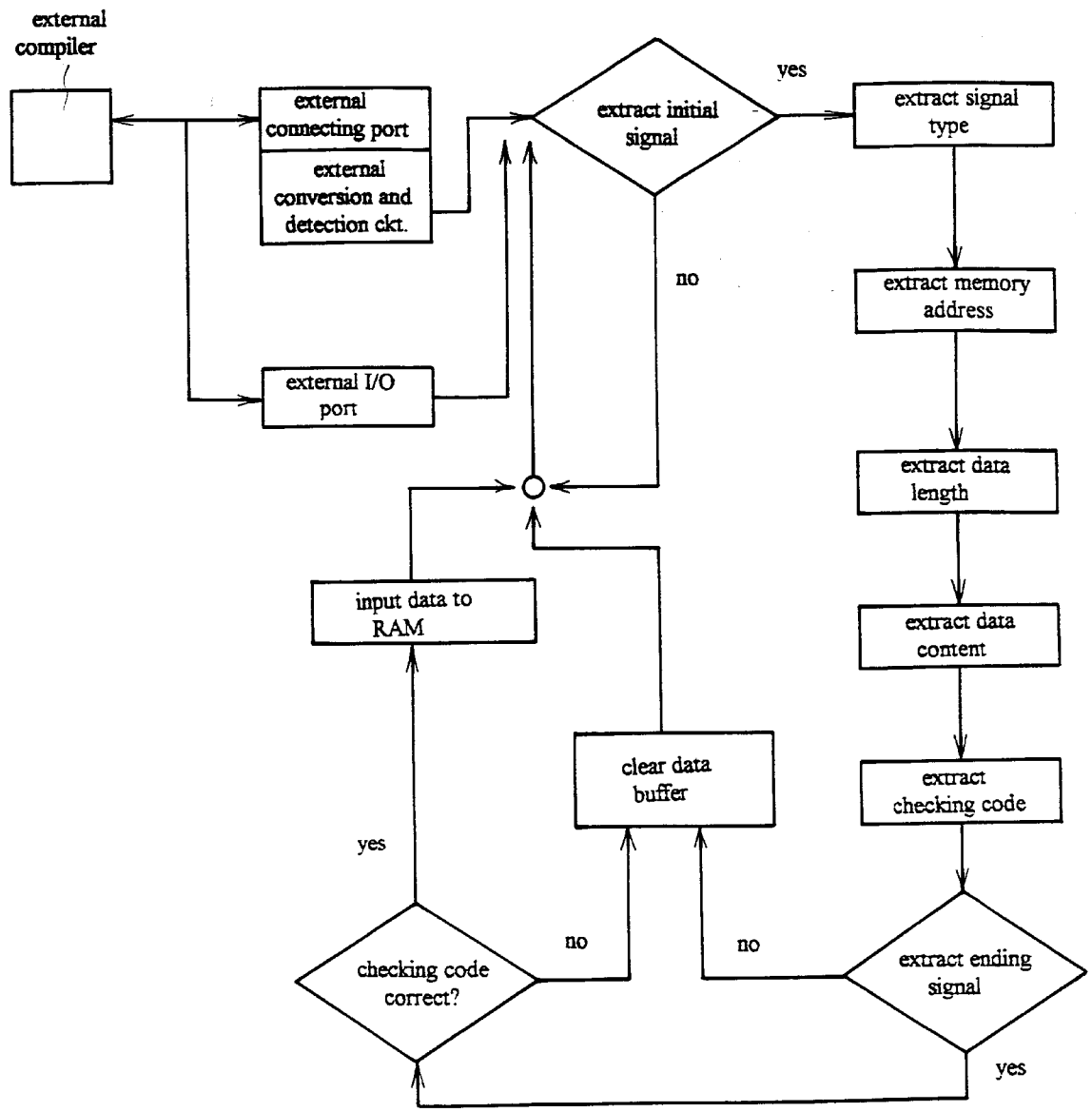
FIG. 2 is a flow diagram of an external editing data input mobile phone.

Now referring to FIG. 2, in the Present invention, as the individual data is inputted into a mobile phone, the initial signal is inputted from an external compiler for informing the central processing unit to initiate data processing process, after the class of data, address of memory, lengths and contents of data, checking code are obtained, the central processing unit will considered whether the checking code is correct, if yes, the data will be stored into the memory and the compiling process is complete.

Figure 3:
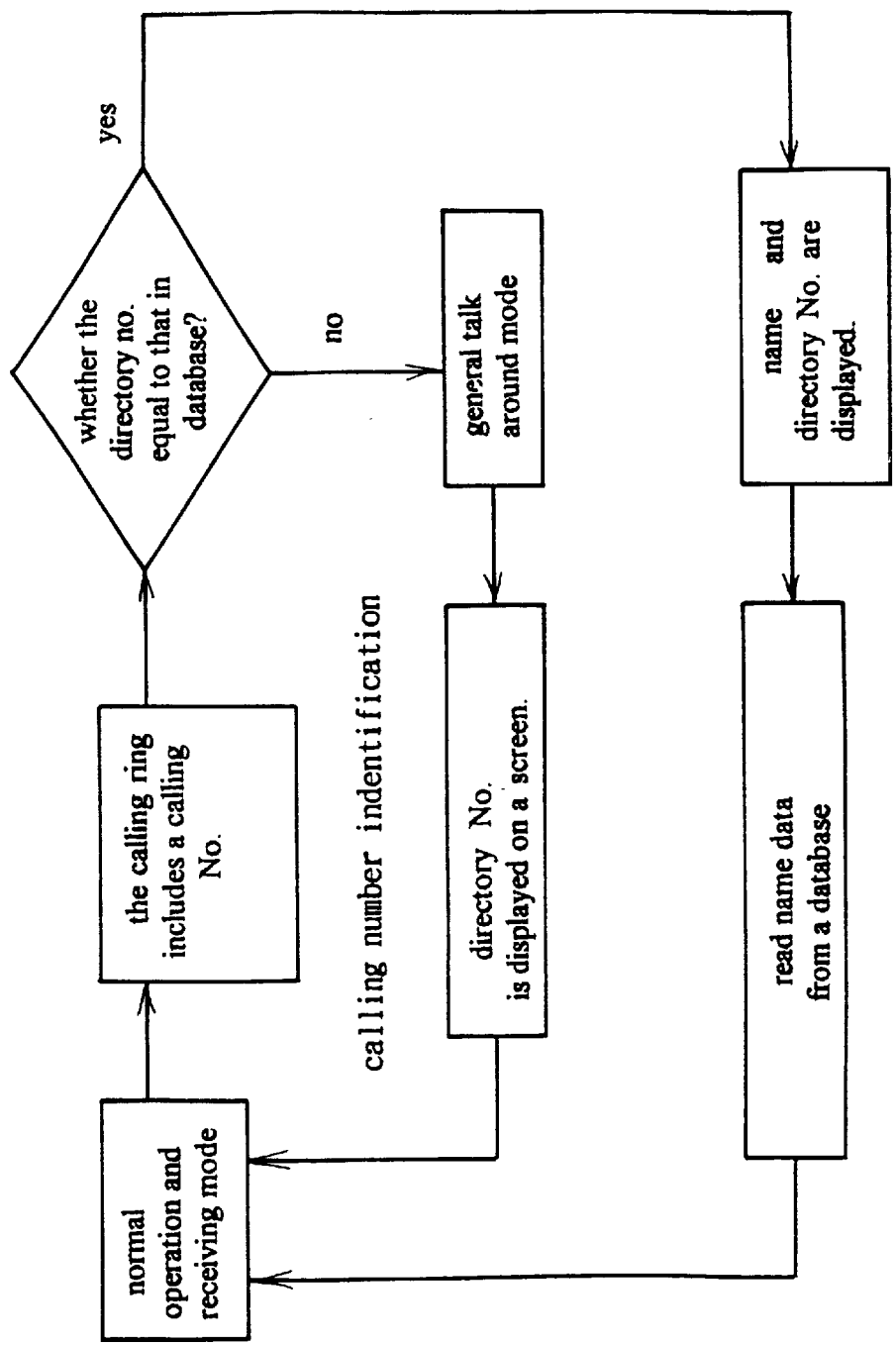
FIG. 3 is a flow diagram shown the data flow after the directory number received by the mobile phone is identified.

While as the mobile phone receives a message, as shown in FIG. 3, at first, the mobile phone will check whether the received data string is stored in the memory, if yes, then the name within the data memory is read and next the name and directory number are displayed on a display screen. If no, the data string is converted into a general normal code and the directory number is displayed on the displayed screen.

Figure 4:
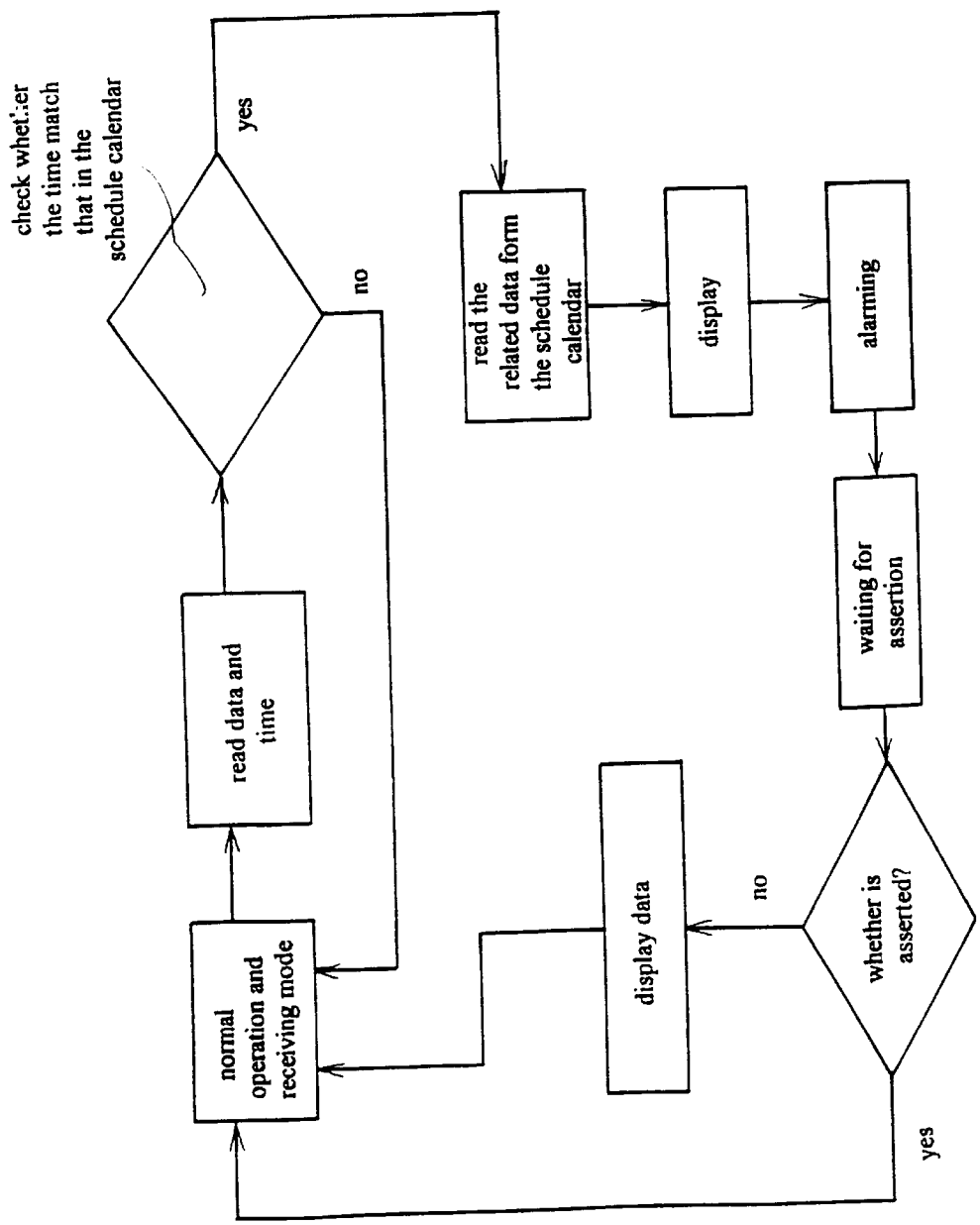
FIG. 4 is a flow diagram for processing a schedule calendar of the present invention.

Referring to FIG. 4, when a schedule calendar is processed in the present invention, the current data and time are read firstly and then considered whether they are matched with the data and time indicated by the schedule calendar. If yes, the related data of the schedule calendar are read out, and they are displayed on the displayed screen and sound for being recognized by the mobile phone. If the data is recognized to be correct, then the data will be displayed on the displayed screen.

Referring to FIG. 5, during editing the data in the present invention, since the memory within the mobile phone is limited, thus when the data is transferred through said software, it may be selected for transferring. The software within the directory may be classified into seven (or above seven) kinds, while each kind has fifty pieces of data as the transferring fixing data, and which has the function of transferring and ordering, thus the number of data has over fifty, these data may be ordered as required. The data not to be stored may be transferred to an auxiliary database, now only the number, name, directory number are transferred, while the other data are not displayed.

Figure 6:
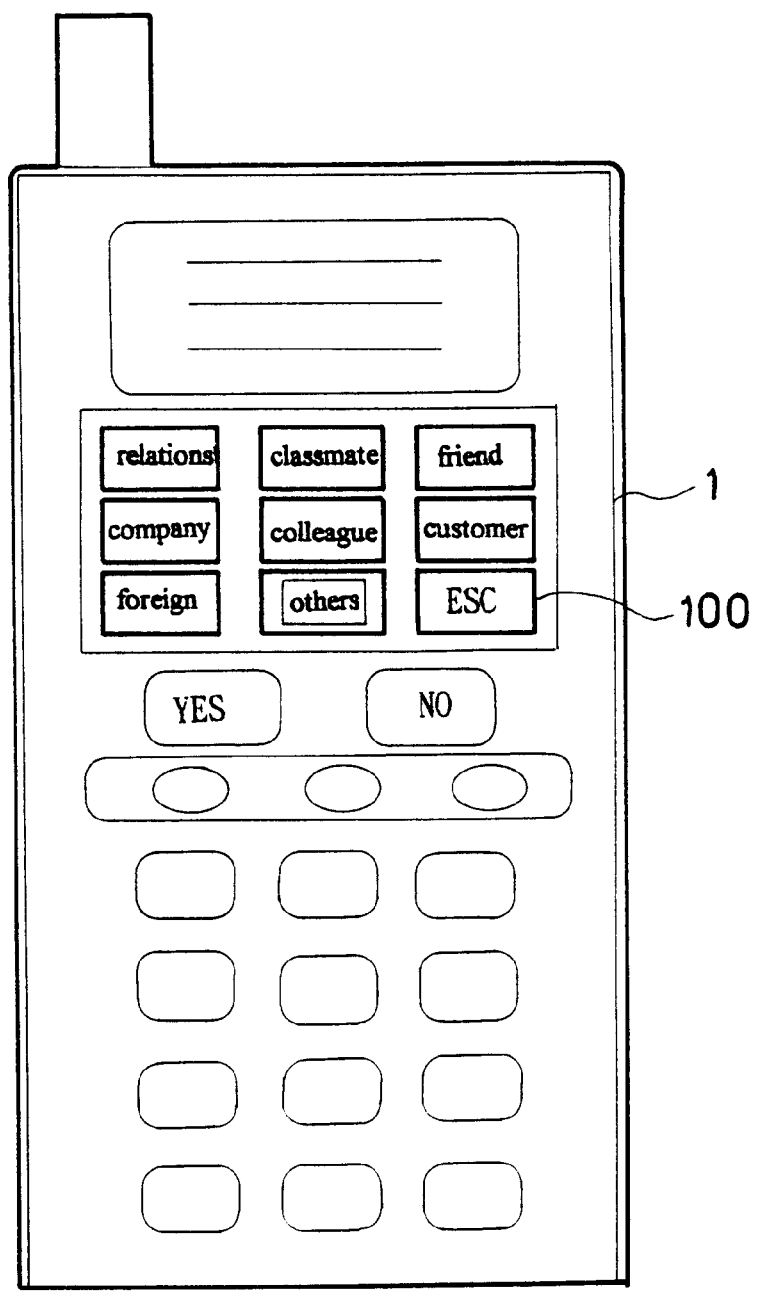
FIG. 6 is a schematic view of the embodiment for searching data by the mobile phone of the present invention.

As shown in FIG. 6, during searching data in the present invention, the sectional number could be inputted according to classification, and then the data may be searched by clinking the keys of the mobile phone (1), or individual class may be displayed on the screen (100) for selecting. This easy and fast searching method may increment the using frequency of the directory.

In summary, in the present invention, the external compiling method is used to improve the linkage of the conventional mobile phone and computer, thus the mobile phone may be used to compile pictograph for being searched as pleasure and the usage is improvement.

Those skilled in the art will readily recognize various modifications and changes which may be made to the present invention without strictly following the exemplary embodiment and application illustrated and described herein, and without departing from the true spirit and scope of the present invention which is set forth in the following claims.

DESCRIPTION OF THE NUMERALS IN THE FIGURES

| | | | |
|---|---|---|---|
| 1 | mobile phone | 11 | central processing unit |
| 12 | external data I/O port | 13 | external data conversion and detection circuit |
| 100 | display screen | 14 | random memory |
| 15 | word database memory | 16 | external I/O port |

What is claimed is:

1. A processing circuit combined with a mobile telephone to provide a directory and schedule calendar, said processing circuit comprising:

an LCD display;

a central processor having an output coupled to said LCD display;

a random access memory circuit coupled to said central processor for storing telephone directory data therein, said random access memory circuit having a backup battery for maintaining said stored telephone directory data, said random access memory circuit having a plurality of predefined storage areas respectively corresponding to a plurality of telephone directory classifications, said central processor including means for reading said telephone data from said random access memory circuit;

a port for connecting an external computing device coupled to said central processor for input of said telephone directory data from the external computing device;

a conversion and detection circuit coupled between said port and said central processor for detecting signals from said port and transforming a level thereof to a level compatible with said central processor; and, a telecommunication receiving circuit having a digital data output coupled to said central processor for transferring a telephone number of a calling party to the central processor;

said central processor including means for comparing the transferred telephone number with said stored telephone directory data, said comparing means outputting a name associated with the telephone number to said LCD display responsive to a match being found in said random access memory circuit and outputting the telephone number to the LCD display responsive to a failure to find a match in said random access memory circuit.

2. The processing circuit combined with a mobile telephone as recited in claim 1 further comprising means for selecting any one of said plurality of telephone directory classifications from which telephone directory data will be read by said central processor and displayed on said LCD display.

3. The processing circuit combined with a mobile telephone as recited in claim 1 further comprising means for comparing a current time of day with a schedule calendar stored in said random access memory circuit, said time comparing means outputting schedule calendar data and activating an annunciator responsive to a match between the current time of day and an entry of the schedule calendar being found in said random access memory circuit.

* * * * *